(12) United States Patent
Ahn et al.

(10) Patent No.: US 11,252,373 B2
(45) Date of Patent: Feb. 15, 2022

(54) VIDEO CALL MEDIATING APPARATUS, METHOD AND COMPUTER READABLE RECORDING MEDIUM THEREOF

(71) Applicant: HYPERCONNECT, INC., Seoul (KR)

(72) Inventors: Sangil Ahn, Cheongju-si (KR); Byong Jong Kim, Hanam-si (KR)

(73) Assignee: Hyperconnect, Inc., Seoul (KR)

( * ) Notice: Subject to any disclaimer, the term of this patent is extended or adjusted under 35 U.S.C. 154(b) by 0 days.

(21) Appl. No.: 16/931,534

(22) Filed: Jul. 17, 2020

(65) Prior Publication Data
US 2021/0037209 A1    Feb. 4, 2021

(30) Foreign Application Priority Data

Jul. 29, 2019 (KR) .......................... 10-2019-0091753

(51) Int. Cl.
| | |
|---|---|
| *H04N 7/14* | (2006.01) |
| *G06F 3/0488* | (2013.01) |
| *H04L 29/08* | (2006.01) |
| *H04L 67/306* | (2022.01) |

(52) U.S. Cl.
CPC .......... *H04N 7/147* (2013.01); *G06F 3/0488* (2013.01); *H04L 67/306* (2013.01)

(58) Field of Classification Search
CPC combination set(s) only.
See application file for complete search history.

(56) References Cited

U.S. PATENT DOCUMENTS

| | | |
|---|---|---|
| 8,666,454 B2 | 3/2014 | Sim et al. |
| 10,728,499 B2 | 7/2020 | Ahn, II et al. |
| 11,032,512 B2 | 6/2021 | Ahn et al. |

(Continued)

FOREIGN PATENT DOCUMENTS

| | | |
|---|---|---|
| EP | 3481058 A1 | 5/2019 |
| EP | 3487169 A1 | 5/2019 |

(Continued)

OTHER PUBLICATIONS

Extended European Search Report for European Application No. 20188232.1, Search completed Oct. 23, 2020, dated Nov. 2, 2020, 8 Pgs.

(Continued)

*Primary Examiner* — Maria El-Zoobi
(74) *Attorney, Agent, or Firm* — KPPB LLP (57) ABSTRACT

A video call mediating apparatus, method and computer readable recording medium thereof are disclosed. The video call mediating method according to an embodiment of the present disclosure includes establishing a video call session between a first terminal and a second terminal; obtaining user information about the first terminal and user information about the second terminal; displaying a video obtained by the first terminal, a video obtained by the second terminal, and a profile of a user of the second terminal, on first to third areas of a display area of the first terminal, respectively; receiving a selection input regarding the profile of the user of the second terminal from a user of the first terminal; and in response to receiving the selection input, displaying contents uploaded by the user of the second terminal on a fourth area on the display area of the first terminal.

23 Claims, 11 Drawing Sheets

(56) References Cited

U.S. PATENT DOCUMENTS

| | | | |
|---|---|---|---|
| 2015/0227902 A1* | 8/2015 | Bertanzetti | G06Q 20/384 |
| | | | 705/42 |
| 2016/0352671 A1* | 12/2016 | Vaccari | H04L 51/32 |
| 2018/0232562 A1* | 8/2018 | Cambor | G06Q 50/01 |
| 2019/0075340 A1* | 3/2019 | Hochart | H04N 21/4532 |
| 2019/0158784 A1 | 5/2019 | Ahn, II et al. | |
| 2020/0203024 A1* | 6/2020 | Hunter | H04L 65/1063 |

FOREIGN PATENT DOCUMENTS

| | | | |
|---|---|---|---|
| JP | H1196229 A | 4/1999 | |
| JP | 2017138948 A | 8/2017 | |
| JP | 2019088004 A | 6/2019 | |
| KR | 20110080347 A | 7/2011 | |
| KR | 101669521 B1 | 10/2016 | |
| KR | 20190056538 A | 5/2019 | |

OTHER PUBLICATIONS

Office Action for Korean Application No. 10-2019-0091753, dated Jul. 7, 2020.

Japanese Office Action for Application No. 2020-121806, dated Nov. 22, 2021, 3 pages.

\* cited by examiner

VIDEO CALL MEDIATING APPARATUS, METHOD AND COMPUTER READABLE RECORDING MEDIUM THEREOF

CROSS-REFERENCE TO THE RELATED APPLICATION

This application is based on and claims priority from Korean Patent Application No. 10-2019-0091753 filed on Jul. 29, 2019, in the Korean Intellectual Property Office, the disclosure of which is incorporated herein in its entirety by reference.

BACKGROUND

1. Field

The present disclosure relates to a video call mediating apparatus, method and computer readable recording medium thereof, and more particularly, to a video call mediating apparatus that is capable of inducing a smoother conversation in a video call between non-acquaintances by simultaneously displaying, on a video call screen, the contents uploaded by the counterpart, and a method and computer readable recording medium thereof.

2. Description of the Related Technology

With the development of communication technology and miniaturization of electronic devices, personal terminals are being widely used by general consumers. In particular, portable personal terminals such as smart phones or smart tablets have been widely used in recent years.

Most of the terminals comprise communication functions, and are connected to communication networks to exchange data, for example, videos and voices, with other terminals.

A video call can be made between a plurality of terminals using this function. When a video call service is provided by accessing a video call platform, a video call can be made between people who do not know each other.

In cases where a video call is being made between non-acquaintances, it may be difficult to have a natural conversation, but if you can find a suitable conversation topic, you can expect a smoother conversation.

However, in existing services that provide video calls between non-acquaintances, in providing information about the users, there was no choice but to limit the type and number of the information, so it was difficult for the video call user to obtain information about the counterpart.

Thus, a method became necessary that could provide information about the connected counterpart while not harming the user experience of the user performing the video call, and thereby induces smooth conversation.

SUMMARY

Therefore, a purpose of the present disclosure is to provide a video call mediating apparatus that is capable of inducing smooth conversation in a video call between non-acquaintances, and a method and computer readable recording medium thereof.

A video call mediating method according to an embodiment of the present disclosure includes establishing a video call session between a first terminal and a second terminal; obtaining user information about the first terminal and user information about the second terminal; displaying a video obtained by the first terminal, a video obtained by the second terminal, and a profile of a user of the second terminal, on first to third areas of a display area of the first terminal, respectively; receiving a selection input regarding the profile of the user of the second terminal from a user of the first terminal; and in response to receiving the selection input, displaying contents uploaded by the user of the second terminal on a fourth area on the display area of the first terminal.

Further, the video call mediating method may further include displaying the video obtained by the second terminal, the video obtained by the first terminal, and a profile of the user of the first terminal, on a display area of the second terminal.

Further, the contents may include one or more image or video selected by each user, and the one or more image or video may be displayed in an order predetermined by the each user or in a random order.

Further, a size of the fourth area may be greater than a size of the third area.

Further, the video call mediating method may further include, upon completion of playing the contents, ending the displaying of the profile or displaying the profile on the third area again.

Further, the selection input may include a touch input.

Meanwhile, a video call mediating apparatus according to an embodiment of the present disclosure may include a receiver for receiving a video call mediation request from a plurality of terminals; an extractor for obtaining user information corresponding to a user of the terminal that transmitted the video call mediation request; a controller for establishing a video call session between a first terminal and a second terminal, of the plurality of terminals, and for displaying a video obtained by the first terminal, a video obtained by the second terminal, and a profile of a user of the second terminal, on first to third areas of a display area of the first terminal, respectively; and an input interface for receiving a selection input regarding the profile of the user of the second terminal from a user of the first terminal, wherein the controller, in response to receiving the selection input, may display contents uploaded by the user of second terminal, on a fourth area on the display area of the first terminal.

Further, the controller may display a video obtained by the second terminal, a video obtained by the first terminal, and a profile of the user of the first terminal, on a display area of the second terminal.

Further, the contents may include one or more image or video selected by each user, and the controller may display the one or more image or video in an order predetermined by the each user or in a random order.

Further, a size of the fourth area may be greater than a size of the third area.

Further, the controller, upon completion of playing the contents, may end displaying the profile or display the profile on the third area again.

Further, the selection input may include a touch input.

Meanwhile, a computer readable recording medium where a program for performing the video call mediating method according to the present disclosure is recorded may be provided.

The present disclosure may provide a video call mediating apparatus that is capable of inducing smooth conversation in a video call between non-acquaintances, and a method and computer readable recording medium thereof.

DETAILED DESCRIPTION

The advantages and characteristics of the present disclosure, and the method for achieving those advantages and characteristics will be clarified with reference to the embodiments that will be described hereinafter together with the drawings attached hereto. However, the present disclosure is not limited to the embodiments disclosed hereinafter, but may be implemented in various different forms, and the present embodiments are provided merely for the purpose of complete disclosure of the present disclosure, and for the purpose of informing a person skilled in the art of the complete scope of the present disclosure, and the present disclosure is to be defined only by the scope of the claims. Like reference numerals indicate like components throughout the entirety of the specification.

Even though "a first" or "a second" and the like are used to describe various components, these components are not limited by the aforementioned terms. The aforementioned terms can only be used to differentiate one component from other components. Therefore, a first component mentioned hereinafter may be a second component within the technical idea of the present disclosure.

The terms used in the present specification were used to describe the embodiments, and not to limit the present disclosure. In the present specification, a singular form includes plural forms unless specially mentioned otherwise. "Comprises" or "comprising" used in the present specification imply that the mentioned component or step does not exclude the presence or addition of one or more other component or step.

Unless defined otherwise, all the terms used in the present specification may be construed to mean what may be commonly understood by a person skilled in the art. Further, the terms defined in generally used dictionaries should not be construed ideally or overly unless clearly defined specially.

Figure 1:
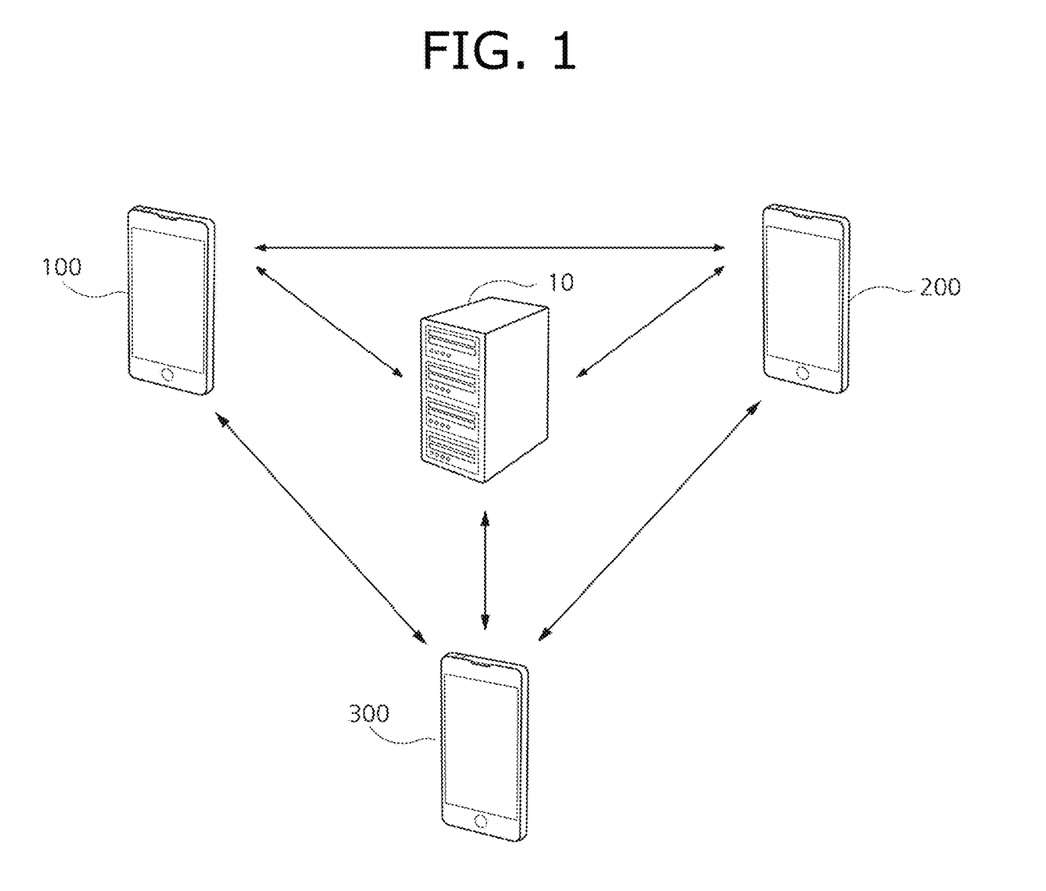
FIG. 1 is a schematic view of an environment where a video call mediating apparatus according to the present disclosure operates.

FIG. 1 is a view schematically illustrating an environment where a video call mediating apparatus according to the present disclosure operates. Referring to FIG. 1, an environment where a first terminal 100, a second terminal 200, and a third terminal 300 operate may include a server 100, and the first terminal 100, the second terminal 200, and the third terminal, that are interconnected with the server 10. For convenience of description, FIG. 1 illustrates only three terminals, that is, the first terminal 100, the second terminal 200, and the third terminal 300, but more number of terminals than three may be included. Regarding the terminals to be added, besides the description to be particularly mentioned, the description about the first terminal 100, the second terminal 200, and the third terminal 300 may be applied.

The server 10 may be connected to a communication network. The server 10 may be interconnected with another external device through the communication network. The server 10 may transmit data to the other interconnected device or receive data from the other device.

The communication network connected with the server 10 may include a wired communication network, wireless communication network, or composite communication network. The communication network may include a terminal communication network such as 3G, LTE, or LTE-A, etc. The communication network may include a wired or wireless communication network such as Wi-Fi, UMTS/GPRS, or Ethernet, etc. The communication network may include a local area communication network such as Magnetic Secure Transmission (MST), Radio Frequency IDentification (RFID), Near Field Communication (NFC), ZigBee, Z-Wave, Bluetooth, Bluetooth Low Energy (BLE), or Infra-Red communication (IR), etc. The communication network may include Local Area Network (LAN), Metropolitan Area Network (MAN), or Wide Area Network (WAN), etc.

The server 10 may be interconnected with at least one of the first terminal 100, the second terminal 200, and the third terminal 300 through the communication network. When the server 10 is interconnected with the first terminal 100, the server 10 may exchange data with the first terminal 100 through the communication network. When the server 10 is interconnected with the second terminal 200, the server 10 may exchange data with the second terminal 200 through the communication network. When the server 10 is interconnected with the third terminal 300, the server 10 may exchange data with the third terminal 300 through the communication network.

The server 10 may receive data from at least one of the first terminal 100, the second terminal 200, and the third terminal 300. The server 10 may perform an operation using the data received from at least one of the first terminal 100, the second terminal 200, and the third terminal 300. The server 10 may transmit a result of the operation to at least one of the first terminal 100, the second terminal 200, and the third terminal 300.

The server 10 may receive a video call mediation request from a plurality of terminals of the first terminal 100, the second terminal 200, and the third terminal 300. The server 10 may select the plurality of terminals that transmitted the mediation request. For example, the server 10 may select the first terminal 100 and the second terminal 200, of the first terminal 100, the second terminal 200, and the third terminal 300.

The server 10 may mediate a video call connection between the selected first terminal 100 and the second terminal 200. For example, the server 10 may transmit connection information regarding the first terminal 100 to the second terminal 200. In another example, the server 10 may transmit connection information regarding the second terminal 200 to the first terminal 100.

The connection information regarding the first terminal 100 may include, for example, IP address and port number of the first terminal 100. The first terminal 100 that received the connection information regarding the second terminal 200 may attempt connection to the second terminal 200 using the received connection information.

As a connection attempt by the first terminal 100 to the second terminal 200 or a connection attempt by the second terminal 200 to the first terminal 100 succeeds, a video call session between the first terminal 100 and the second terminal 200 may be established. Through this video call session, the first terminal 100 may transmit video or sound to the second terminal 200. The first terminal 100 may encode the video or sound into digital signals, and transmit the encoded result to the second terminal 200.

Further, the first terminal 100 may receive video or sound from the second terminal 200. The first terminal 100 may receive the video or sound encoded into digital signals, and decode the received video or sound.

Through the video call session, the second terminal 200 may transmit video or sound to the first terminal 100. Further, through the video call session, the second terminal 200 may receive video or sound from the first terminal 100. Thus, the user of the first terminal 100 and the user of the second terminal may have a video call with each other.

The first terminal 100, the second terminal 200, and the third terminal 300 may be, for example, a desktop computer, laptop computer, smart phone, smart tablet, smart watch, mobile terminal, digital camera, wearable device, or portable electric device, etc. The first terminal 100, the second terminal 200, and the third terminal 300 may execute a program or application. The first terminal 100, the second terminal 200, and the third terminal 300 may be devices of a same type, or devices of different types.

Figure 2:
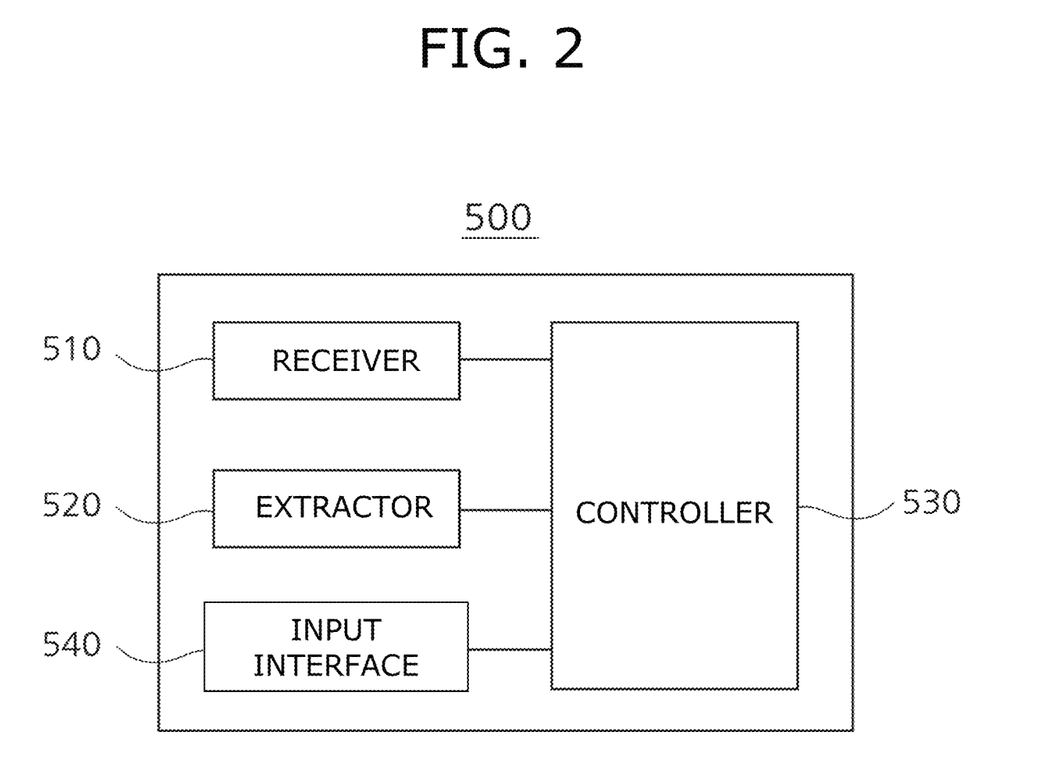
FIG. 2 is a schematic view of the configuration of a video call mediating apparatus according to an embodiment of the present disclosure.

FIG. 2 is a view schematically illustrating the configuration of the video call mediating apparatus according to an embodiment of the present disclosure.

Referring to FIG. 2, a video call mediating apparatus 500 according to an embodiment of the present disclosure includes a receiver 510, an extractor 520, a controller 530, and an input interface 540. The receiver 510 receives a video call mediation request from a plurality of terminals. The plurality of terminals may perform practically the same operations as the terminals 100, 200, 300 described above with reference to FIG. 1. Further, the video call mediating apparatus 500 may be configured using the server 10 described above with reference to FIG. 1.

The receiver 510 may receive the video call mediation request from the plurality of terminals, and a video call session may be established between the terminals that transmitted the video call mediation request. Here, users of the terminals between which the video call session is established may know each other's contact number, or may not know each other.

The extractor 520 obtains user information corresponding to the user of the terminal that transmitted the video call mediation request. The user information may be transmitted together to the video call mediating apparatus 500 as the video call mediation request is transmitted from the corresponding terminal. Otherwise, the user information may be prestored in the video call mediating apparatus 500. Therefore, the video call mediating apparatus 500 may include a storage means.

The user information may include a nickname, profile photograph and the like of the user of the corresponding terminal. Further, the user information may be understood as meaning the information that the user input when subscribing to the video call service being provided through the video call mediating apparatus 500. That is, the user information obtained by the extractor 520 may include all the information provided by the user using the video call service.

The controller 530 may establish the video call session between the first terminal and the second terminal of the plurality of terminals. The first terminal and the second terminal correspond to the terminals that transmitted the video call mediation request. In the present specification, the first terminal and the second terminal are used as an example for convenience of description, but it will be obvious to one skilled in the related art that there may be further terminals, including the first terminal and the second terminal, between which the video call session may be established by the controller 530.

When the video call session is established between the first terminal and the second terminal, the controller 530 displays, on a display area of the first terminal, a video obtained by the first terminal, a video obtained by the second terminal, and a profile of the user of the second terminal, on a first area, a second area, and a third area, respectively.

The first terminal and the second terminal may include a photographing device (not illustrated) such as a camera, and this camera may be disposed on a front surface or on a rear surface of the terminal, or on the front surface and on the rear surface of the terminal. For example, a video obtained through a front surface camera or a rear surface camera of the first terminal may be displayed on the first area existing on the display area of the first terminal.

Likewise, a video obtained through a front surface camera or a rear surface camera of the second terminal may be displayed on the second area existing on the display area of the first terminal. Further, a profile of the user of the second terminal may be displayed on the third area existing on the display area of the first terminal. Meanwhile, the first to third areas may or may not overlap with one another.

In one embodiment, the video obtained by the first terminal and the video obtained by the second terminal may be a video stored in the first terminal and the second terminal, respectively. In this case, not the video obtained by the photographing device provided in the first terminal and the second terminal, but an already stored image or video may be displayed on the first area or the second area.

The input interface 540 receives a selection input regarding the profile of the user of the second terminal from the user of the first terminal. The selection input may include a touch input, and the selection input may be an input of selecting the third area where the profile of the user of the second terminal is displayed. The input interface 540 may include a keyboard, a mouse, a touch pad, a scanner, and/or so on, not being limited thereto.

The controller 530 displays contents uploaded by the user of the second terminal on a fourth area on the display area of the first terminal in response to receiving the selection input. In one embodiment, the fourth area may correspond to the third area, wherein the contents may be displayed on an area corresponding to the area where the user profile is displayed. Otherwise, the fourth area may be an area that includes the third area, wherein the shape and size of the third area may be different from the shape and size of the fourth area. In the present specification, the reason for distinguishing between the third area and the fourth area is to distinguish the area where the user profile may be displayed and the area where the contents uploaded by the user may be displayed, and thus the third area and the fourth area may be determined to be practically identical.

Existing one-on-one video calls display images of the counterpart and images of oneself through terminals, and display the profile information about the counterpart together, for example, profile photograph, nickname and the like. The video call mediating apparatus 500 according to the present disclosure may display the contents uploaded by the counterpart user as well besides the information that existing one-on-one video calls provide or display. The contents may be displayed or played through the same terminal screens while the one-on-one video call is being performed.

For example, in a case of performing a one-on-one video call with a user who uploaded a plurality of images and a plurality of videos, by selecting the profile of the counterpart user or the third area where the profile is displayed, the contents uploaded by the counterpart user may be displayed. The plurality of images and the plurality of videos may be displayed on the fourth area in a predetermined order. This predetermined order may correspond to the order in which the plurality of images and the plurality of vides were uploaded, but the present disclosure is not necessarily limited thereto.

Meanwhile, a video uploaded by the user may be played for the total playing time of the corresponding video, and an image may be displayed for a predetermined period of time and once the predetermined period of time lapses, next contents may be displayed.

In another embodiment, even before completion of playing a video, the next contents may be displayed upon receiving a user input, and even when the predetermined period of time has not lapsed yet, upon receiving a user input, the image currently being displayed may be interrupted, and the next contents may be displayed.

Figure 3:
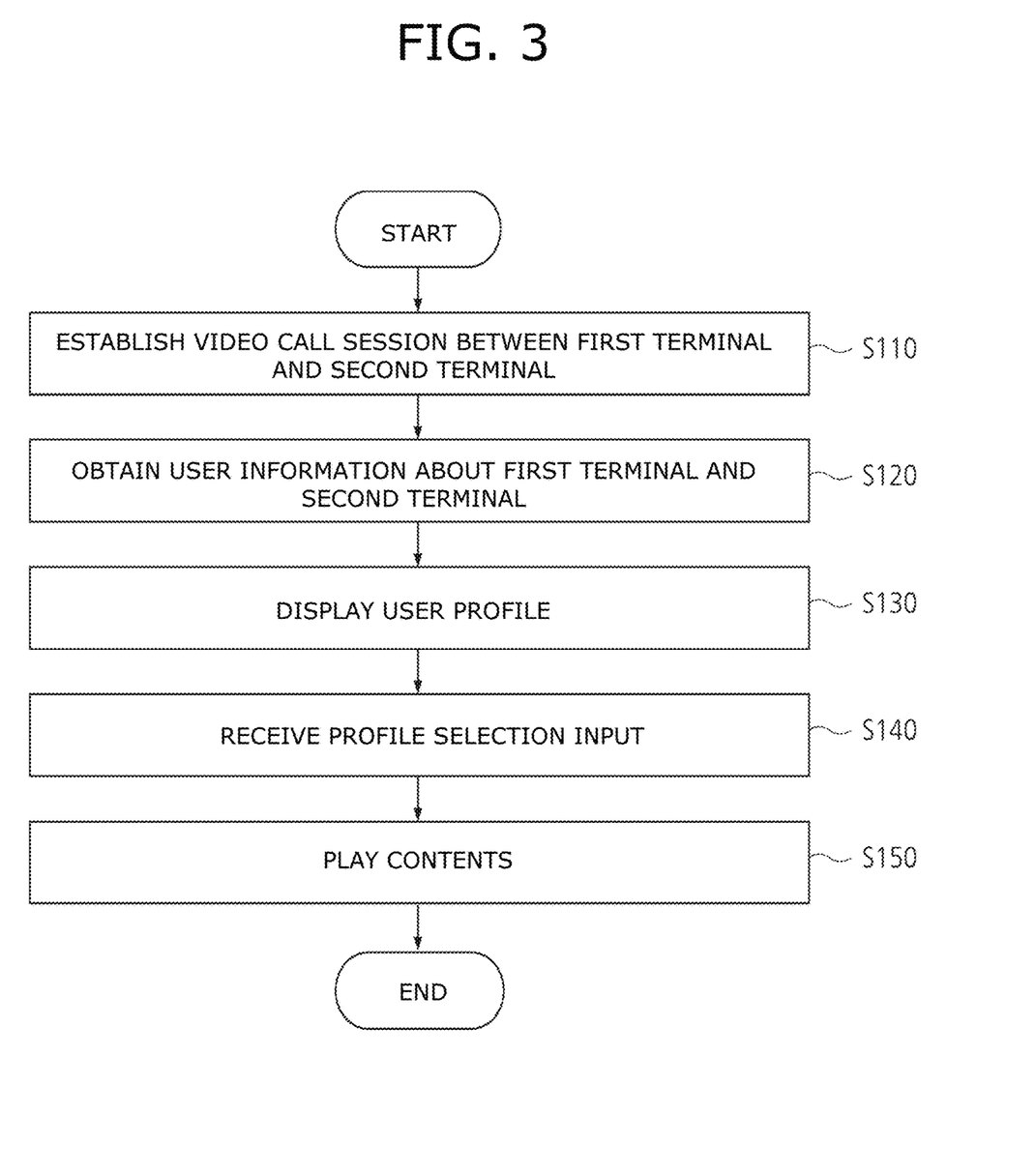
FIG. 3 is a flowchart schematically illustrating a video call mediating method according to an embodiment of the present disclosure.

FIG. 3 is a flowchart illustrating a video call mediating method according to an embodiment of the present disclosure.

Referring to FIG. 3, the video call mediating method according to an embodiment of the present disclosure includes establishing a video call session between a first terminal and a second terminal (S110), obtaining user information about the first terminal and the second terminal (S120), displaying user profile and the like (S130), receiving a profile selection input (S140), and playing contents (S150).

The first terminal and the second terminal may be understood as having practically the same configurations as the first terminal 100 and the second terminal 200 described above with reference to the aforementioned drawings. Further, the video call mediating method that will be described with reference to FIG. 3 may be performed through the server 10 described above with reference to FIG. 1 and the video call mediating apparatus 500 described above with reference to FIG. 2.

At step S110, a video call session is established between the first terminal and the second terminal. The video call session may be established by the controller 530 described above with reference to FIG. 2, and the first terminal and the second terminal may be understood as corresponding to the terminals that transmitted a video call mediation request. In the present specification, for convenience of description, the first terminal and the second terminal were used as an example, but it will be obvious to one skilled in the related art that there may be more terminals between which the video call session may be established at step S110 besides the first terminal and the second terminal. That is, the first terminal and the second terminal are terms merely used to indicate that they are different terminals, and thus they do not mean any specific two terminals.

At step S120, user information about the first terminal and user information about the second terminal are obtained. That is, at step S120, the user information about a plurality of terminals that are interconnected through the video call session are obtained. Obtaining of the user information at step S120 may be performed after the video call session is established at step S110, but the present disclosure is not necessarily limited thereto, and thus it may be performed even before the video call session is established. In this case, the user information may be obtained beforehand regarding any terminal that can perform a video call through the method of the present disclosure.

The user information may include a nickname, profile photographs and the like of the user of the corresponding terminal. Further, the user information may be understood as meaning the information that the user input when subscribing to the video call service being provided through the video call mediating method according to the present disclosure. That is, the user information obtained at step S120 may include all the information that the user using the video call service provided.

At step S130, a video obtained by the first terminal, a video obtained by the second terminal, and user profile of the second terminal may be displayed on the first to third areas, respectively, on the display area of the first terminal.

The first terminal and the second terminal may include a photographing device (not illustrated) such as a camera, and the camera may be disposed on a front surface or on a rear surface of the terminal, or on the front surface and on the rear surface of the terminal. For example, the video obtained through the front surface camera or the rear surface camera of the first terminal may be displayed on the first area existing on the display area of the first terminal.

Likewise, the video obtained through the front surface camera or the rear surface camera of the second terminal may be displayed on the second area existing on the display area of the first terminal. Further, the profile of the user of the second terminal may be displayed on the third area existing on the display area of the first terminal. Meanwhile, the first to third areas may or may not overlap with one another.

In one embodiment, the video obtained by the first terminal and the video obtained by the second terminal may be a video stored in the first terminal and the second terminal, respectively. In this case, not the video obtained by the photographing device provided in the first terminal and the second terminal, but an already stored image or video may be displayed on the first area or the second area.

At step S140, a selection input regarding the profile of the user of the second terminal is received from the user of the first terminal. The selection input may include a touch input, and the selection input may be an input of selecting the third area where the profile of the user of the second terminal is displayed.

At step S150, contents uploaded by the user of the second terminal are displayed on the fourth area on the display area of the first terminal in response to receiving the selection input. In one embodiment, the fourth area may correspond to the third area, wherein the contents may be displayed on an area corresponding to the area where the user profile is displayed. Otherwise, the fourth area may be an area that includes the third area, wherein the shape and size of the third area may be different from the shape and size of the fourth area. In the present specification, the reason for distinguishing between the third area and the fourth area is to distinguish the area where the user profile may be displayed and the area where the contents uploaded by the user may be displayed, and thus the third area and the fourth area may be determined to be practically identical.

Existing one-on-one video calls display images of the counterpart and images of oneself through terminals, and display the profile information about the counterpart, for example, profile photograph, nickname and the like. The video call mediating method according to the present disclosure may display the contents uploaded by the counterpart user as well besides the information that existing one-on-one video calls provide or display. The contents may be displayed or played through the same terminal screens while the one-on-one video call is being performed.

For example, in a case of performing a one-on-one video call with a user who uploaded a plurality of images and a plurality of videos, by selecting the profile of the counterpart user or the third area where the profile is displayed, the contents uploaded by the counterpart user may be displayed. The plurality of images and the plurality of videos may be displayed on the fourth area in a predetermined order. This predetermined order may correspond to the order in which the plurality of images and the plurality of videos were uploaded by the corresponding user, but the present disclosure is not necessarily limited thereto.

Meanwhile, the video uploaded by the user is played for the total playing time of the corresponding video, and the image is displayed for a predetermined period of time, and once the predetermined period of time lapses, next contents may be displayed.

In another embodiment, even before completion of playing the video, the next contents may be displayed upon receiving a user input, and even when the predetermined period of time has not lapsed yet, upon receiving a user input, the image currently being displayed may be interrupted, and the next contents may be displayed.

FIGS. 4A, 4B, 5A and 5B are views exemplifying a screen where user uploaded contents are displayed according to an embodiment of the present disclosure.

FIGS. 4A, 4B, 5A and 5B exemplify a video call screen where a video call session is established and performed between two users, and for convenience of description, a screen displayed on a first terminal being used by a first user will be used as an example.

Figure 4A:
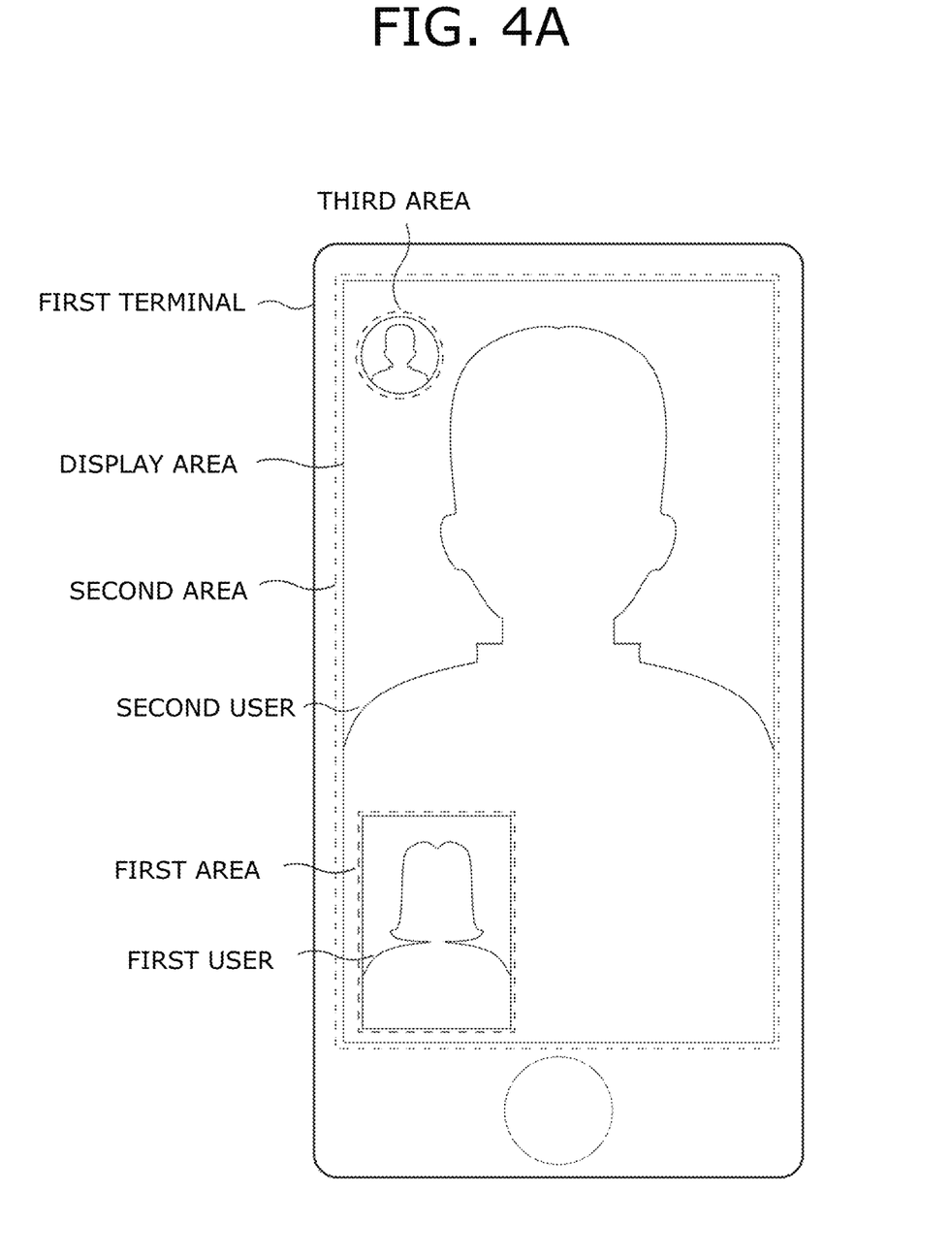
FIGS. 4A, 4B, 5A and 5B are views exemplifying a screen where user uploaded contents are displayed according to an embodiment of the present disclosure.

First, referring to FIG. 4A, a first terminal that includes a display area is illustrated. The display area may include first to third areas, wherein in the first area, a video obtained through the first terminal may be displayed. In FIG. 4A, it may be understood that the video of the first user is being obtained through the first terminal.

Meanwhile, on the second area, a video obtained through a second terminal may be displayed, and in FIG. 4A, it may be understood that the video of a second user is being obtained through the second terminal. Further, a profile of a user of the second terminal may be displayed on the third area. The profile displayed on the third area may be an image directly selected and uploaded by the user of the second terminal, that is, the second user.

Further, the profile image may be understood to have been uploaded when the second user subscribed to the video call service or thereafter as user information, and the video call mediating method according to the present disclosure may load the user information and display the profile image after the video call session is established. However, it is also possible to have the user information loaded even before the video call session is established when a video call mediation request is transmitted from the second user.

Figure 4B:
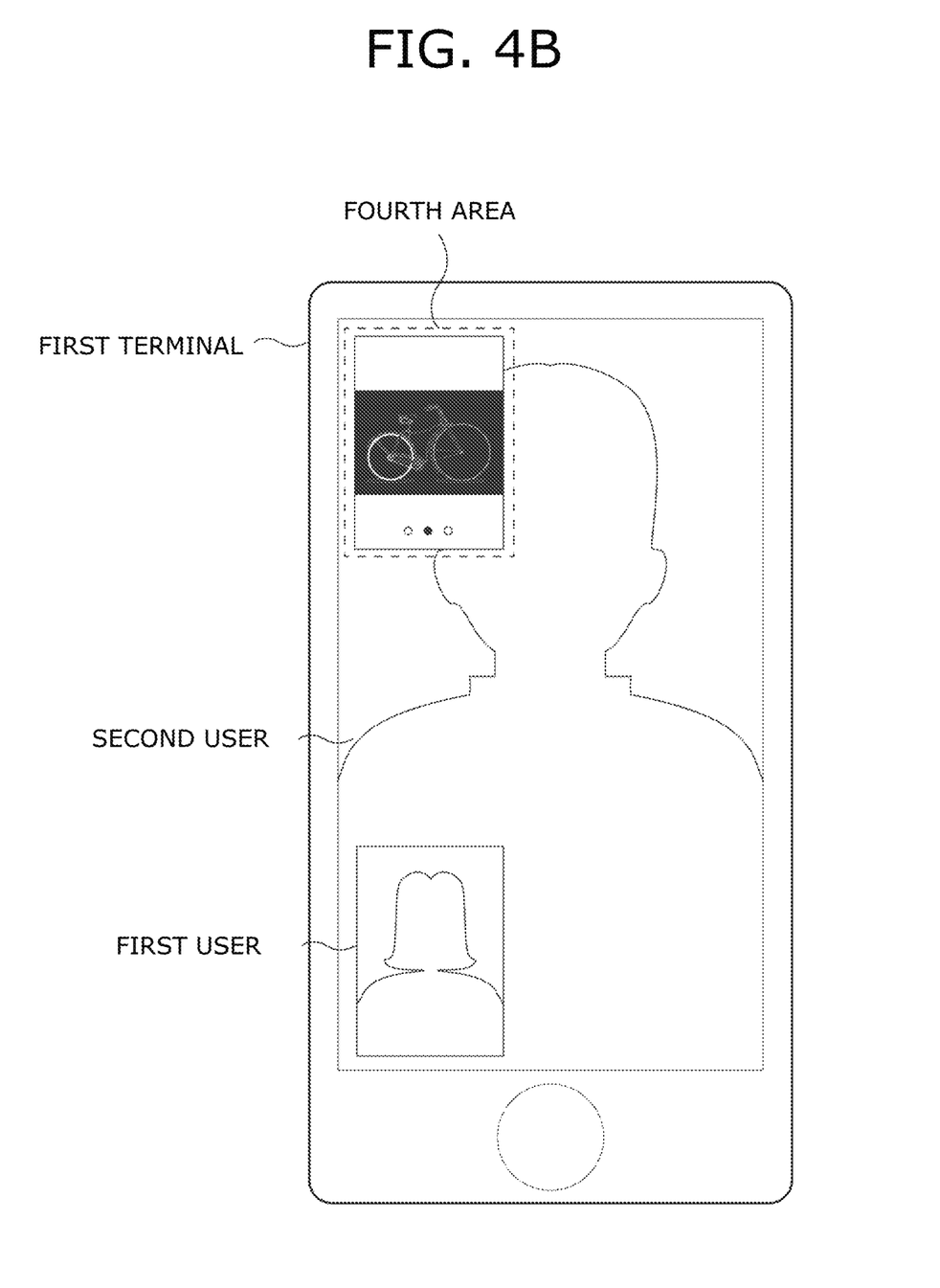

FIG. 4B exemplifies a screen displayed on the first terminal after a selection input is received from the user of the first terminal, that is, the first user. Referring to FIG. 4B, when the selection input is received, contents uploaded by the second user may be displayed on the fourth area.

The fourth area is an area distinct from the third area. The fourth area may include the third area, and the shape and size of the fourth area may be different from the shape and size of the third area.

The contents may include one or more image or video that each user selected. In FIG. 4B, the contents displayed on the fourth area are uploaded by the second user, and other users besides the second user may anticipate interests, hobbies and tendencies of the second user through the contents.

Meanwhile, the selection input may be a touch input regarding the third area. In a display device that does not support touch inputs, the touch input may be a selection input regarding the third area made through other input devices, for example, mouse, trackball, keyboard, etc.

The selection input regarding the third area is a selection input regarding the area where the profile of the counterpart user may be displayed, and enables to check various contents that the counterpart user uploaded while the video call session is established and the video call is being made. Through this, when having a video call with a person you met for the first time, it is possible to anticipate the counterpart's interests, hobbies, tendencies and the like, and have an opportunity to have a more natural conversation.

Likewise, on the display area of the second terminal, when the profile of the first user is displayed, and the selection input regarding the area where the profile of the first user may be displayed is received from the second user, contents such as the image or video uploaded by the first user may be displayed.

Therefore, as the two users performing the video call grasp each other's interests, hobbies, and tendencies, conversation topics may be provided and a more natural conversation can be induced.

Figure 5A:
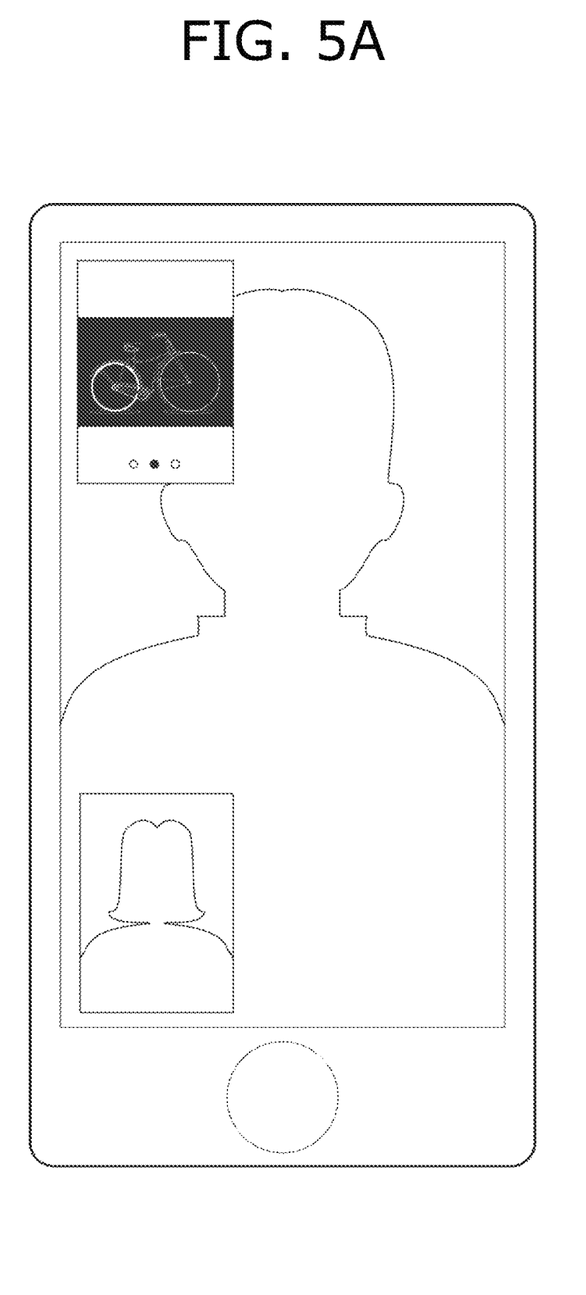
Figure 5B:
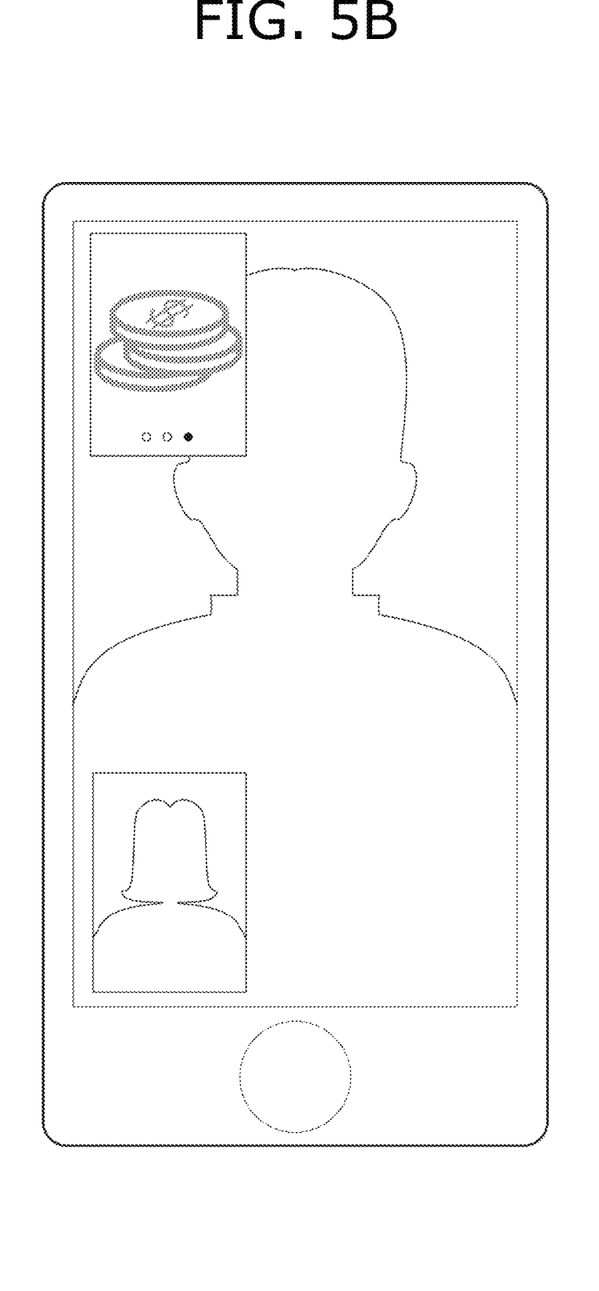

FIGS. 5A and 5B are views exemplifying how the contents uploaded by a user are displayed on the fourth area over time. FIG. 5(a) exemplifies one of the contents that the second user uploaded, showing an image of a bicycle as an example. The bicycle image may be a still cut or a video.

Meanwhile, referring to FIGS. 5A and 5B, it may be understood that there is a total of three contents uploaded by the second user. Of these contents, the image of the bicycle may be the contents displayed second.

The user uploaded contents illustrated in FIG. 5B may be contents displayed subsequently to the image of the bicycle, that is, third contents, which may be a still cut or a video just as the image of the bicycle.

The user uploaded contents, that is, the image or video may be displayed in an order predetermined by each user, or in a random order. Further, the user uploaded contents may be displayed for a predetermined period of time, and once the predetermined period of time lapses, next contents may be displayed. Otherwise, a method may be applied where once the counterpart user selects the user uploaded contents, the next contents are displayed.

Figure 6:
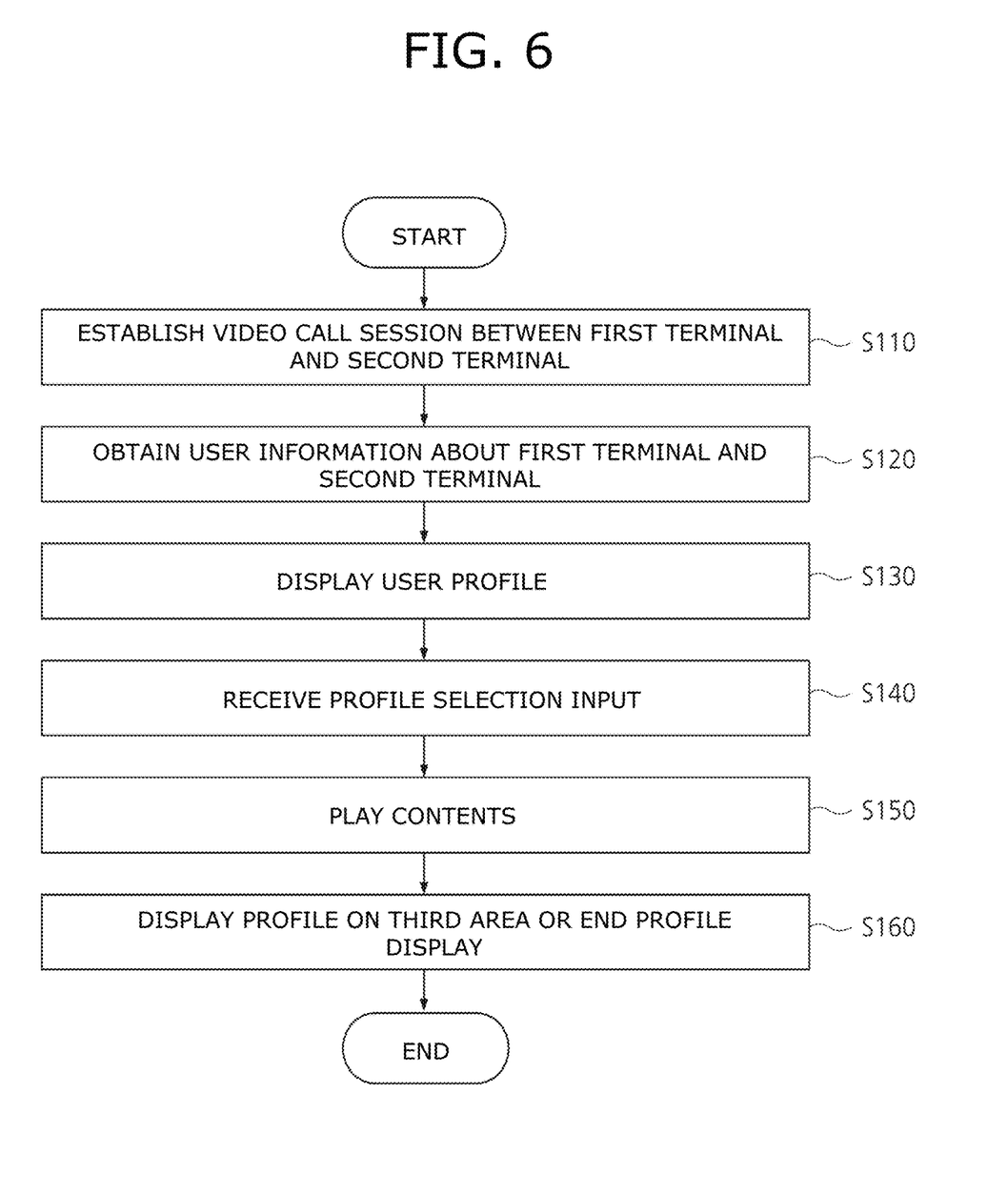
FIG. 6 is a flowchart schematically illustrating a video call mediating method according to another embodiment of the present disclosure.

FIG. 6 is a flowchart schematically illustrating the video call mediating method according to another embodiment of the present disclosure. Referring to FIG. 6, the video call mediating method according to the other embodiment of the present disclosure further includes displaying the profile on the third area or ending displaying of the profile (S160).

At step S160, when the playing of the contents at step S150 ends, just as the user profile was displayed on the third area at step S130, the user profile is displayed on the third area again. This may be understood as a conversion from the screen illustrated in FIG. 5A or FIG. 5B to the screen illustrated in FIG. 4A.

At step S160, when the user profile is displayed on the third area again, if the first user makes a selection input regarding the third area or the user profile, step S150 may be performed again.

Further, at step S160, when the playing of the contents ends, the displaying of the contents and the user profile may end. That is, it may be understood that when the playing of the contents at step S150 ends, only the video obtained through the first terminal and the video obtained through the second terminal are displayed on the display area of the first terminal.

Figure 7A:
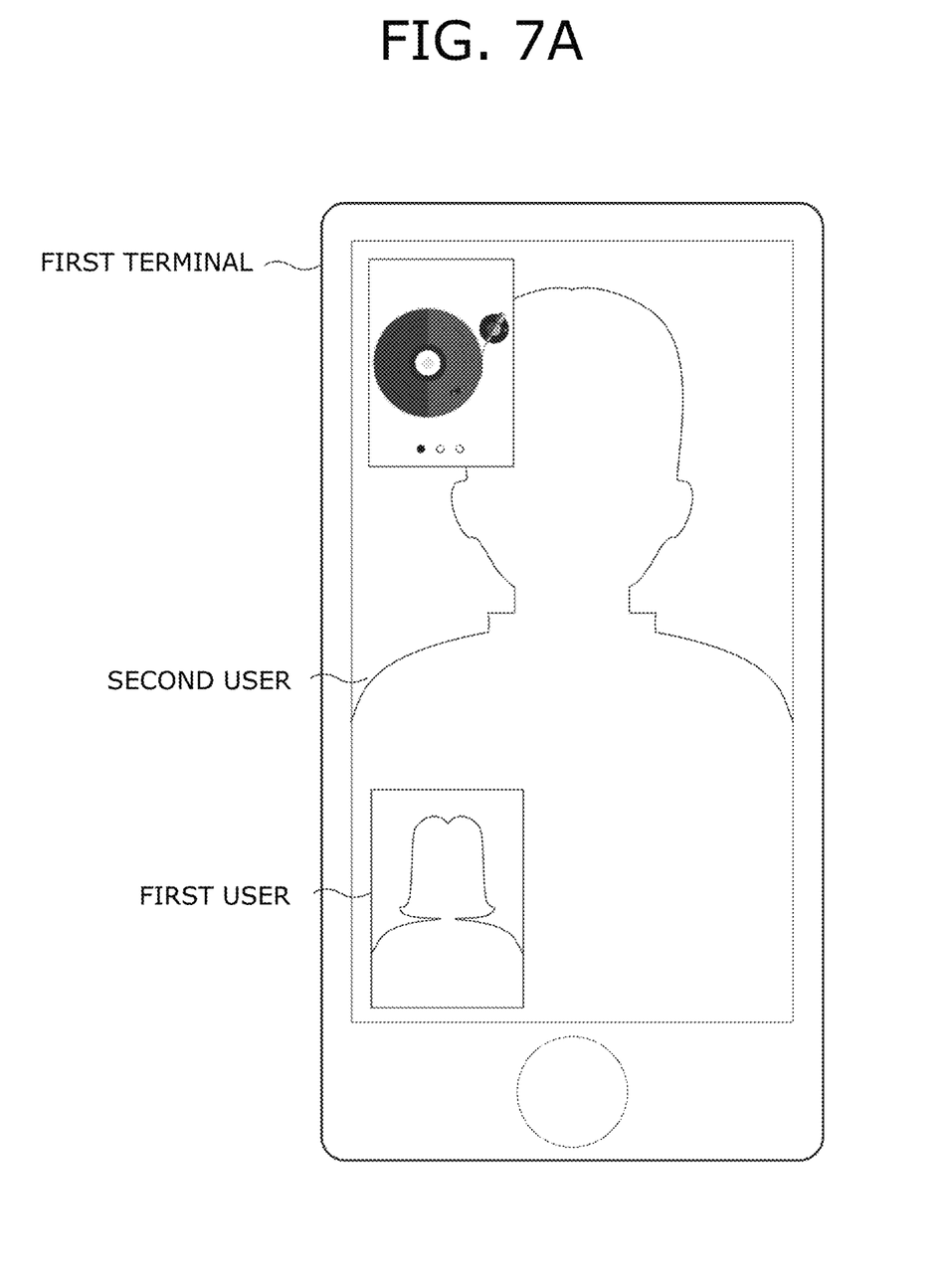
FIGS. 7A and 7B are views exemplifying a screen where user uploaded contents are displayed according to another embodiment of the present disclosure.
Figure 7B:
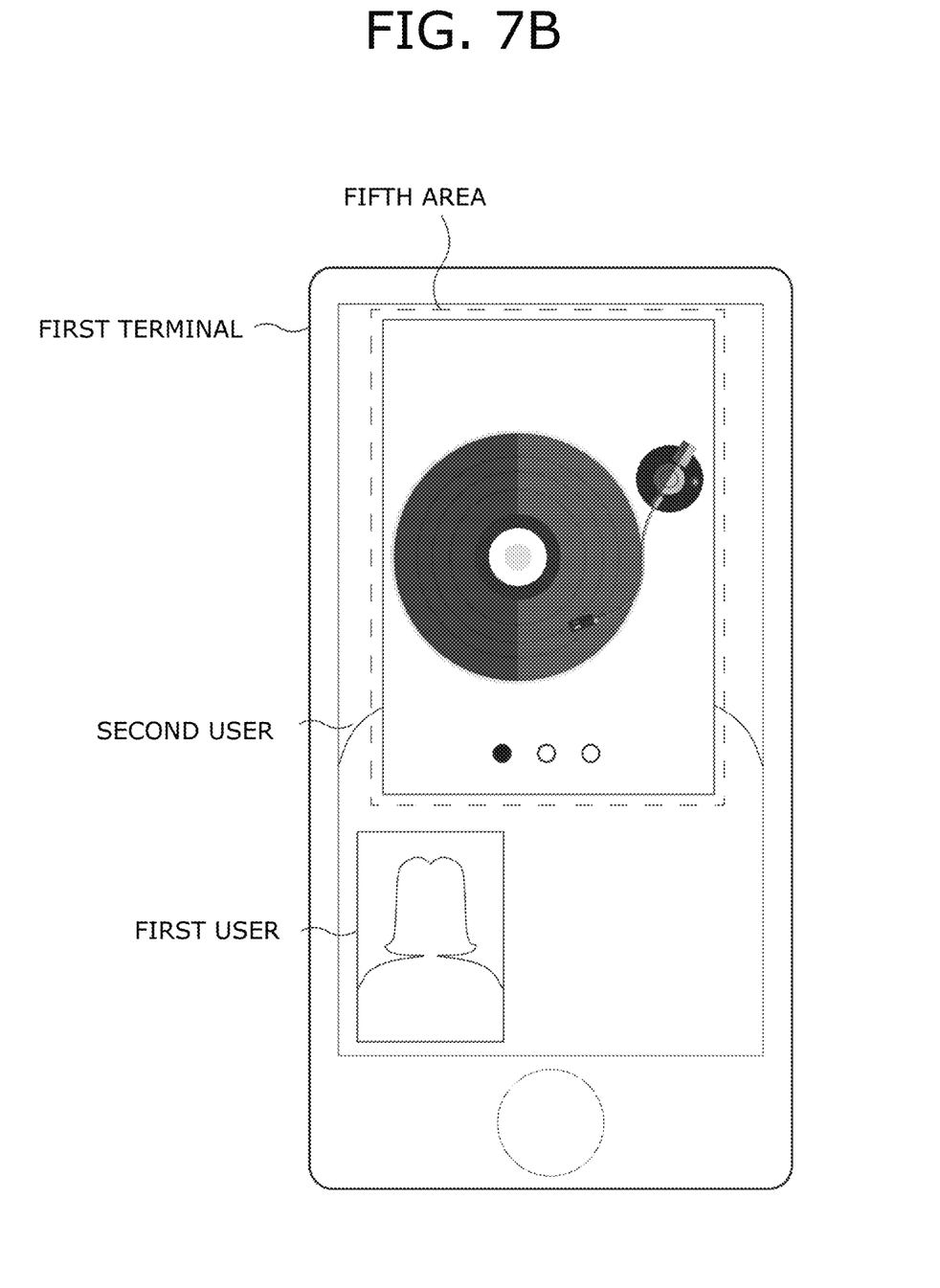

FIGS. 7A and 7B are views exemplifying a screen where the user uploaded contents are displayed according to another embodiment of the present disclosure. As described above with reference to the drawings attached, when the selection input regarding the user profile displayed on the third area is received from the user, the user uploaded contents are displayed on the fourth area.

FIG. 7A exemplifies a screen where the user uploaded contents are displayed on the fourth area. The user input for displaying the user uploaded contents on the fourth area may be defined as a first user input. When the user uploaded contents are displayed as in FIG. 7(a), and a second user input, that is different from the first user input, is received, the user uploaded contents may be displayed on a greater area as illustrated in FIG. 7B.

The second user input may be a selection input regarding the user uploaded contents or the fourth area input by the user of the first terminal while the user uploaded contents are displayed as in FIG. 7A. The first and second user inputs may include a touch input just as the selection input described above with reference to FIG. 3.

Meanwhile, in FIG. 7B, the area where the user uploaded contents are displayed may be defined as a fifth area. After each contents are displayed for a predetermined period of time on the fifth area, the next contents may be displayed. Otherwise, after the playing of the video contents displayed on the fifth area is completed, the next contents may be displayed.

Figure 8:
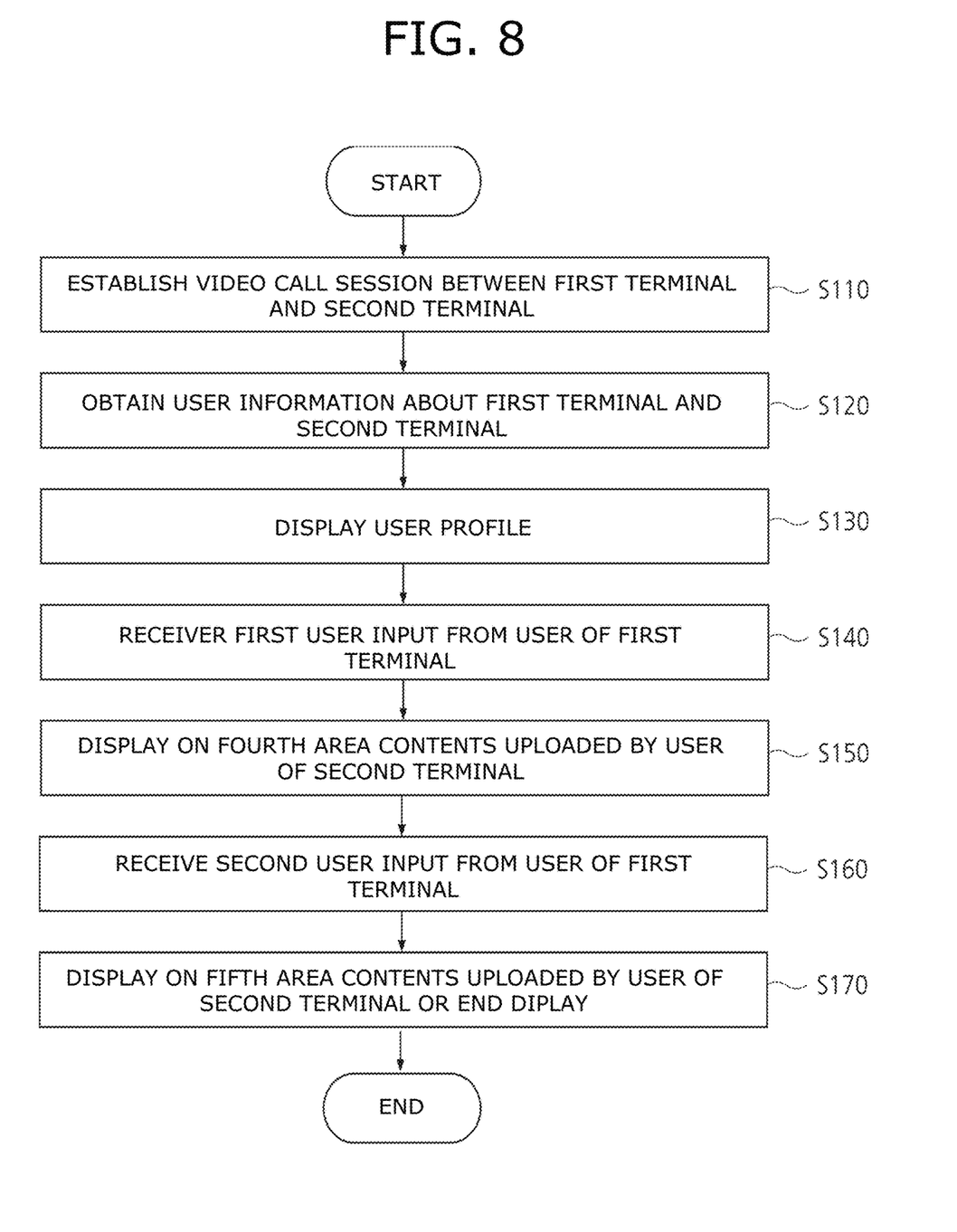
FIG. 8 is a flowchart schematically illustrating a video call mediating method according to another embodiment of the present disclosure.

FIG. 8 is a flowchart schematically illustrating the video call mediating method according to another embodiment of the present disclosure. Referring to FIG. 8, the video call mediating method according to the other embodiment of the present disclosure further includes displaying or ending the user information about the second terminal on the fifth area (S170).

From step S110 to step S130, practically the same operations as from step S110 to step S130 of the video call mediating method described above with reference to FIGS. 3 to 6 are performed. At step S130, the user profile of the second terminal is displayed on the third area of the first terminal, and the user profile of the first terminal is displayed on the third area of the second terminal.

When the first user input is received at step S140, at step S150, the contents uploaded by the user of the second terminal are displayed on the fourth area of the first terminal. Here, it may be understood that the first user input is the same as the selection input described above with reference to the drawings. Operations performed from step S130 to step S150 may be described through FIGS. 7A and 7B.

At step S160, with the contents displayed on the fourth area, a second user input is received from the user of the first terminal. The second user input is different from the first user input, but both inputs may include a touch input. The second user input may be an input of selecting the fourth area or the contents.

When the second user input is received, at step S170, the contents uploaded by the user of the second terminal may be displayed on the fifth area, or the displaying of the contents may end. As illustrated in FIG. 7(b), the fifth area may be set as a greater area than the fourth area on the display area of the terminal, and the fifth area will enable the terminal user to appreciate the contents uploaded by the counterpart more intensively. Otherwise, in response to receiving an input by the second user, on the fourth area, the displaying of the contents on the fourth area may end.

The user may set this more freely, or set it to be displayed on a greater area, or set it in other forms besides ending the display. Therefore, the present disclosure is not limited by the embodiments described above.

The embodiments described above may be embodied in the form of recording media that include instructions executable by a computer, such as program modules that can be executed by a computer. Computer readable media may be any available media that can be accessed by a computer, and may include both volatile and nonvolatile media, and removable and non-removable media.

Further, the computer readable media may include computer storage media. The computer storage media may include both volatile and nonvolatile, and removable and non-removable media embodied in any method or technology for the storage of information such as computer readable instructions, data structures, program modules or other data, etc.

At least one of the components, elements, modules or units (collectively "components" in this paragraph) represented by a block in the drawings (e.g., FIG. 2) may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like The embodiments of the present disclosure were described above with reference to the drawings attached, but those skilled in the art that the present disclosure pertains to will understand that the present disclosure can be implemented in other specific forms without modifying the technical spirit or essential features of the present disclosure. Therefore, it should be understood that the above-described embodiments are illustrative in all respects and not restrictive.

What is claimed is:

1. A video call mediating method comprising:
establishing a video call session between a first terminal and a second terminal;
obtaining user information about the first terminal and user information about the second terminal;
displaying a video obtained by the first terminal, a video obtained by the second terminal, and a profile of a user of the second terminal, on first to third areas of a display area of the first terminal, respectively;
receiving a selection input regarding the profile of the user of the second terminal from a user of the first terminal; and
in response to the receiving the selection input, displaying contents uploaded by the user of the second terminal on a fourth area on the display area of the first terminal.

2. The video call mediating method according to claim 1, further comprising displaying the video obtained by the second terminal, the video obtained by the first terminal, and a profile of the user of the first terminal, on a display area of the second terminal.

3. The video call mediating method according to claim 1, wherein the contents comprise one or more image or video selected by each user.

4. The video call mediating method according to claim 3, wherein the one or more image or video is displayed in an order predetermined by the each user or in a random order.

5. The video call mediating method according to claim 1, wherein a size of the fourth area is greater than a size of the third area.

6. The video call mediating method according to claim 1, further comprising, upon completion of playing the contents, ending the displaying of the profile or displaying the profile on the third area again.

7. The video call mediating method according to claim 1, wherein the selection input comprises a touch input.

8. A non-transitory computer readable recording medium where a program for performing the method of claim 1 is recorded.

9. A non-transitory computer readable recording medium where a program for performing the method of claim 2 is recorded.

10. A non-transitory computer readable recording medium where a program for performing the method of claim 3 is recorded.

11. A non-transitory computer readable recording medium where a program for performing the method of claim 4 is recorded.

12. A non-transitory computer readable recording medium where a program for performing the method of claim 5 is recorded.

13. A video call mediating apparatus comprising:
a receiver configured to receive a video call mediation request from a plurality of terminals;
an extractor configured to obtain user information corresponding to a user of the terminal that transmitted the video call mediation request;
a controller configured to establish a video call session between a first terminal and a second terminal, of the plurality of terminals, and display a video obtained by the first terminal, a video obtained by the second terminal, and a profile of a user of the second terminal, on first to third areas of a display area of the first terminal, respectively; and
an input interface configured to receive a selection input regarding the profile of the user of the second terminal from a user of the first terminal,
wherein the controller, in response to receiving the selection input, displays contents uploaded by the user of second terminal, on a fourth area on the display area of the first terminal.

14. The video call mediating apparatus according to claim 13, wherein the controller is configured to display a video obtained by the second terminal, a video obtained by the first terminal, and a profile of the user of the first terminal, on a display area of the second terminal.

15. The video call mediating apparatus according to claim 13, wherein the contents comprise one or more image or video selected by each user.

16. The video call mediating apparatus according to claim 15, wherein the controller is configured to display the one or more image or video in an order predetermined by the each user or in a random order.

17. The video call mediating apparatus according to claim 13, wherein a size of the fourth area is greater than a size of the third area.

18. The video call mediating apparatus according to claim 13, wherein the controller, upon completion of playing the contents, is configured to end displaying the profile or displaying the profile on the third area again.

19. The video call mediating apparatus according to claim 13, wherein the selection input comprises a touch input.

20. The video call mediating apparatus according to claim 13, wherein the controller is further configured to, display the contents on a fifth area that is larger than the fourth area in response to receiving a user input by the first terminal while the contents are displayed on the fourth area.

21. The video call mediating method according to claim 1, wherein the fourth area at least partially overlaps with the third area.

22. The video call mediating method according to claim 1, further comprising, in response to receiving a user input by the first terminal while the contents are displayed on the fourth area, displaying the contents on a fifth area that is larger than the fourth area.

23. A non-transitory computer readable recording medium where a program for performing the method of claim 21 is recorded.

* * * * *